United States Patent [19]

Olderaan

[11] 4,304,037
[45] Dec. 8, 1981

[54] METHOD AND APPARATUS FOR INSTALLING A SEALING RING

[75] Inventor: Wilhelmus F. T. C. Olderaan, Hardenberg, Netherlands

[73] Assignee: Wavin B.V., Zwolle, Netherlands

[21] Appl. No.: 134,341

[22] Filed: Mar. 26, 1980

[30] Foreign Application Priority Data

Mar. 29, 1979 [NL] Netherlands ................ 79/02473

[51] Int. Cl.³ .................... B23P 19/02; B25B 7/02
[52] U.S. Cl. .................................. 29/451; 277/1
[58] Field of Search ............ 277/1; 81/419; 29/451, 29/235

[56] References Cited

U.S. PATENT DOCUMENTS

3,455,011 7/1969 Harding .................. 81/419
4,091,521 5/1978 Dygert .................... 29/451

Primary Examiner—Robert I. Smith
Attorney, Agent, or Firm—Wilkinson, Mawhinney & Theibault

[57] ABSTRACT

A sealing ring is installed in a groove chamber of a socket by impressing said sealing ring and pushing the impressed sealing ring into the socket, whereafter the impression is terminated and the sealing ring is received in a groove chamber.

An apparatus for carrying out the method comprises a sealing ring impression member and sealing ring retaining means for maintaining the sealing ring in the impressed state.

6 Claims, 13 Drawing Figures

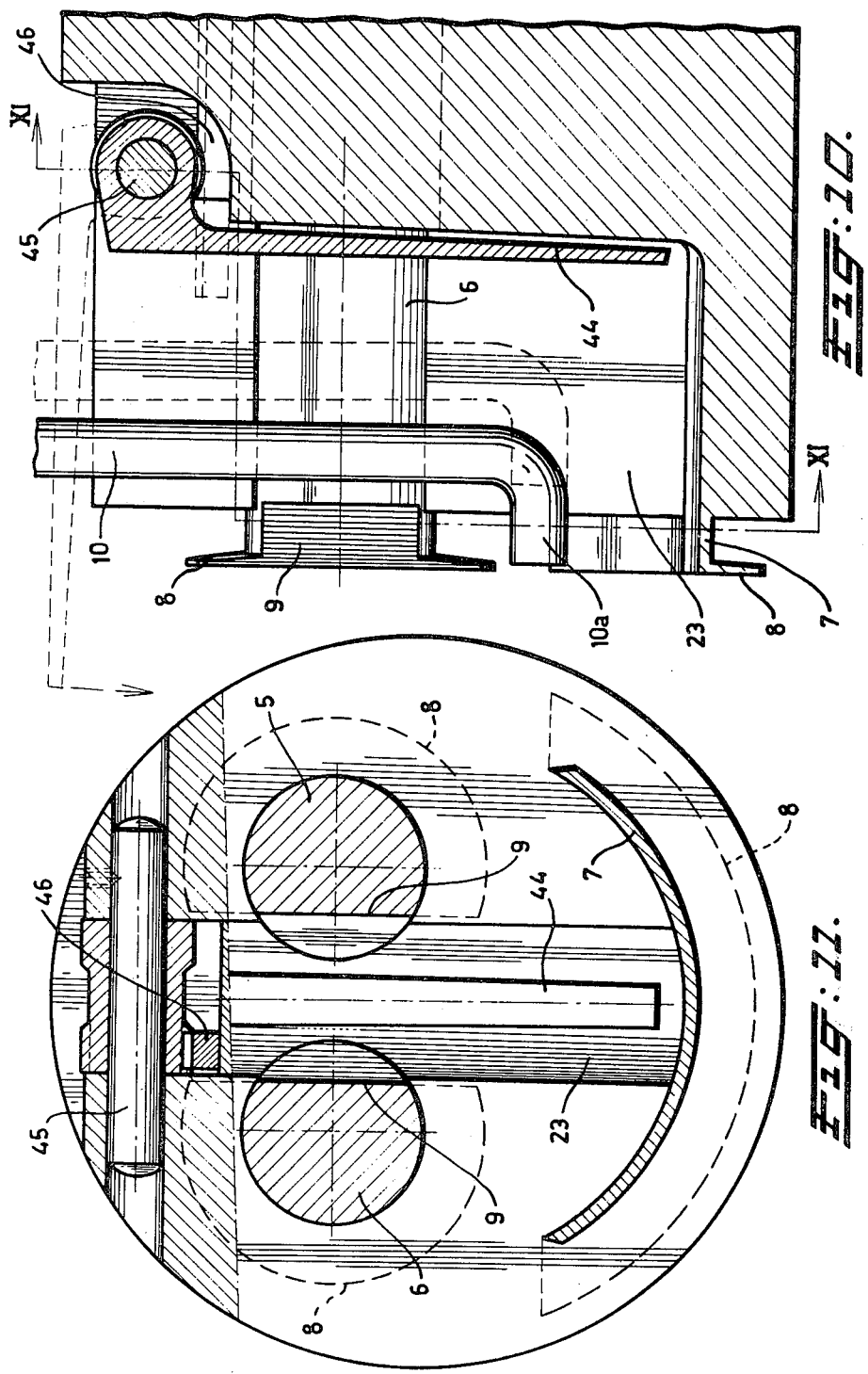

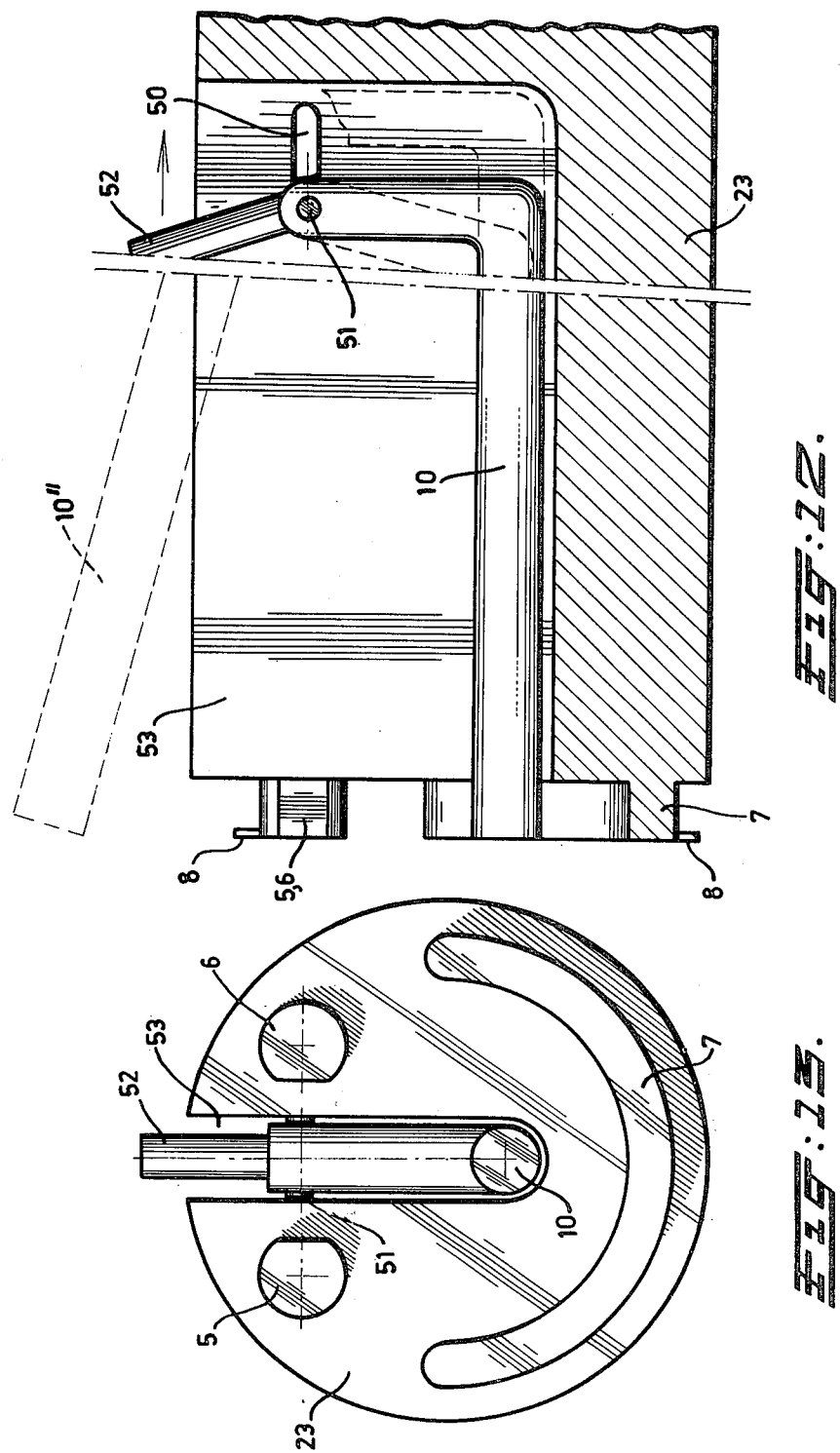

METHOD AND APPARATUS FOR INSTALLING A SEALING RING

BACKGROUND OF THE INVENTION

1. Field of the Invention

The present invention relates to a method of and apparatus for installing a sealing ring in a whether or not simultaneously formed annular groove chamber disposed in a socket end of a pipe part.

2. Description of the Prior Art

In the prior art sealing rings have been installed in an annular groove chamber in a socket end of a pipe part. Said prior art sealing rings provide a perfect and optimum seal between a male pipe part to be pushed into a socket end and said socket end. In actual practice the sealing ring is installed in the open field and is manually provided with a lubricating agent layer so as to facilitate the penetration of a male pipe part.

Many problems have to be faced on installing a sealing ring in a socket end in this way. It often happens that the sealing ring is not provided with an evenly spread lubricating agent layer, thus causing said sealing ring to be pushed out of the groove during the penetration of the male pipe part so that an incorrect and unsatisfactory seal is obtained, a fact which will only be observed later on.

Another drawback is that in certain cases the sealing ring will not correctly and/or exactly be installed in the annular groove chamber.

Efforts have been made to obviate said drawbacks by installing the sealing ring in the annular groove chamber directly after the manufacture of the socket end and the pipe part, but this has proved to be unsuccessful as in some cases it has appeared that the sealing ring falls out of the groove chamber, thus involving many problems when pipe connections have to be realized. Problems also occur in the latter case in introducing the sealing ring.

Apart from the aforementioned possibilities, a sealing ring functioning as a molding body for forming an annular groove chamber, may also be installed in a socket end. The latter method has the drawback that a sealing ring has to be used which comprises a rigid part especially to be mounted in said ring, which part then serves for sliding an initial pipe part across the ring. For that aim an end part of the socket adjacent to the sealing ring has to be shrunk upon a mandrel after removal of a retaining member. This method is not suitable for installing a sealing ring in a socket end, which previously has been provided with a groove chamber in another manner.

SUMMARY OF THE INVENTION

In view of the foregoing factors and conditions of the prior art a method for installing a sealing ring in a whether or not simultaneously formed annular groove chamber in a socket end of a pipe part, is presently in great demand, allowing the use of a normal sealing ring of flexible material without using special rigid inserts for such a sealing ring and ensuring a perfect and accurate instalment of a sealing ring in a formed annular groove chamber, and it is therefore a primary object of the present invention to provide such a method.

This object is attained in accordance with the present invention in that in a method for installing a sealing ring in a whether or not simultaneously formed groove chamber disposed in a socket end of a pipe part, the sealing ring is inwardly impressed thereby decreasing its outer diameter; said impressed sealing ring is then pushed into the socket end, subsequently the impression is terminated and thus the sealing ring is received and left in a groove chamber.

In this manner a sealing ring may be used which consists of a normal resilient material and which can be pushed into a socket end without any damage to either sealing ring or socket end, whereafter said sealing ring is received in the groove chamber in a simple manner and will also remain in said groove chamber. Pushing an impressed sealing ring into a socket end will ensure that the sealing ring will always be pushed into said socket end in the same manner, thus affording an automatic way of installing the sealing ring in an annular groove chamber.

The sealing ring is preferably impressed while supporting the inside of said sealing ring at either side of the impression.

The sealing ring will thus obtain a heart-shaped cross-section and a periphery such, that said sealing ring so can be easily positioned correctly at the point where a groove chamber is accomodated in a socket end of a pipe part.

The sealing ring is preferably internally supported at a third location between the impression and the ring part facing the latter.

The supports at either side of the impression are preferably in the form of rotatable coarse surfaces. By rotating said surfaces the impressed part can be drawn farther toward the interior. In case a third support is used, a right stretching or tightening of the sealing ring over the supports as described hereinbefore, is ensured.

Very advantageously, two opposite parts of the impression, more preferably the parts of the impression located adjacent to the supports, are pressed against one another, thus reducing the total thickness of said opposite parts of said impression. Maintaining the impressed position of the sealing ring is ensured in this manner and no problems will occur when pushing the impressed ring into the socket end.

The present invention is also embodied in apparatus for installing a sealing ring in a whether or not simultaneously formed annular groove chamber, disposed in a socket end of a pipe part, comprising a sealing ring retaining member.

An apparatus of this type has been used in the prior art. In the prior art apparatus the sealing ring retaining member consists of a mandrel and a sleeve which can be slid over said mandrel.

Said known apparatus is inconvenient, as a socket end that has been slid across the sealing ring, in first instance adjoins the sealing ring retaining member, whereafter said part of the socket end has to be shrunk upon the mandrel. In order to perform the latter, special measures have to be taken, such as exerting a sub-atmospheric pressure.

The present invention aims to provide apparatus of the abovementioned type, which does not exhibit said disadvantages.

This object is attained in accordance with the invention in that the apparatus comprises a sealing ring-impression member, retaining means for maintaining the impressed position of a sealing ring, and means to move the retaining means from an active position into an inactive position and reverse.

An apparatus of this type so decreases the circumference of the sealing ring, that said sealing ring can easily be pushed into a socket end until the location where an annular groove chamber is disposed, whereafter said sealing ring may subsequently regain its original dimensions, while being received in the groove chamber. The retaining member conveniently comprises at least two supporting surfaces, and preferably three supporting surfaces, two of which at least consist of rotatable axles in between which the impression member may be displaced. Each of the rotatable axles is conveniently provided with a flat side which flat sides may be placed against one another for allowing passage of the impression member. Preferably, the rotatable axles comprise coarse surfaces so that a sealing ring being supported by said axles may be entrained at the rotation of the respective axles.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 5 shows the manner in which an impressing member has been removed, whilst

FIG. 7 is a completed socket end comprising a sealing ring and a supporting ring.

FIG. 10 is a portion of still a further embodiment of an apparatus according to the invention;

FIG. 11 is a cross-section according to line IX—IX;

FIG. 12 is a further portion of a further embodiment of an apparatus of the invention; and FIG. 13 is a front view of the apparatus of FIG. 12.

DESCRIPTION OF A PREFERRED EMBODIMENT

Figure 1:
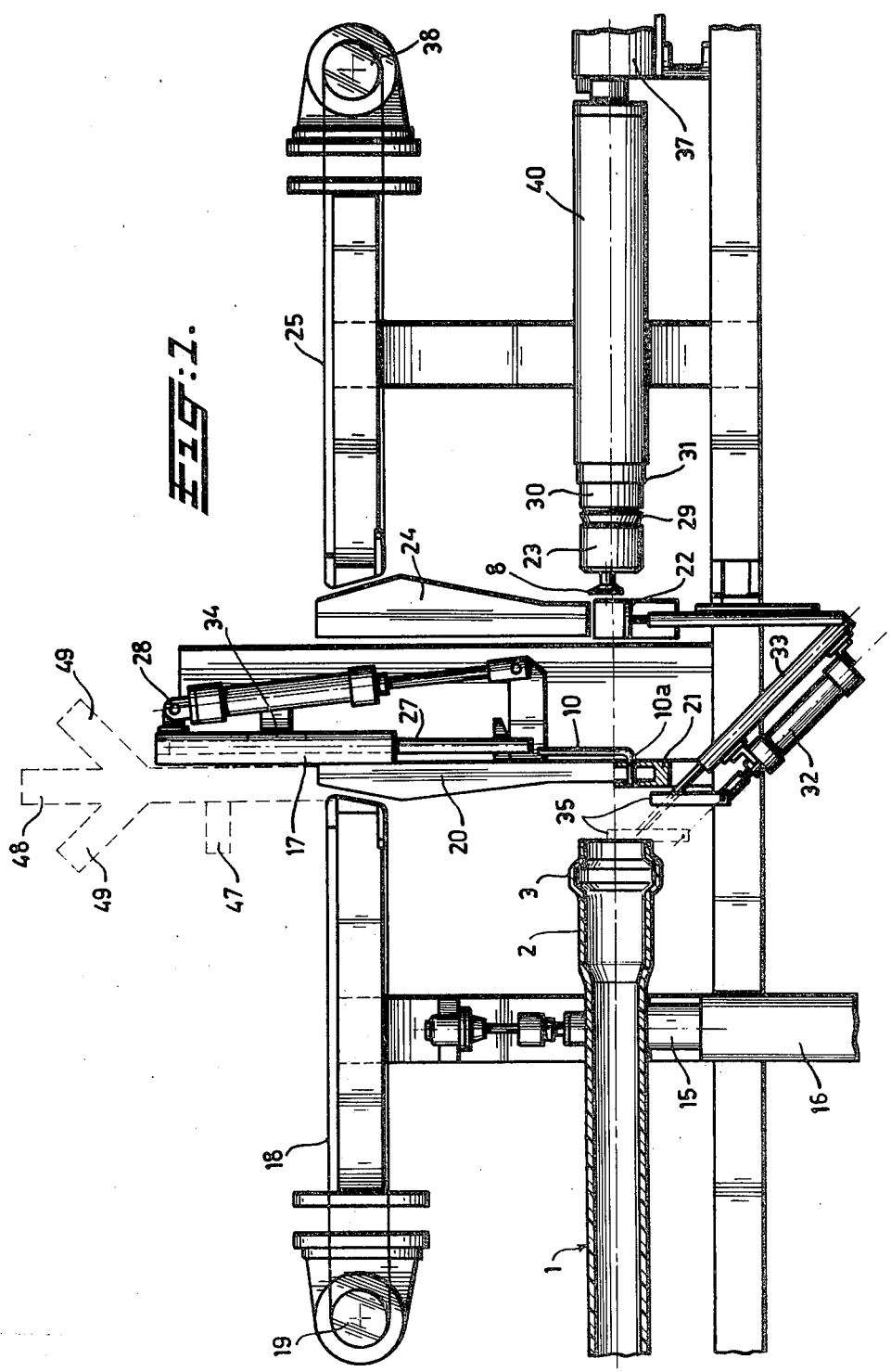
FIG. 1 is a schematic view of an apparatus according to the invention.

Initially referring to FIG. 1 a very schematic view is shown of an apparatus according to the invention for installing a sealing ring in a groove chamber 3 of a socket end 2 of a plastic pipe part 1, In this case the annular groove chamber has previously been formed in the socket end 2. A pipe retaining member 15 being attached to a frame 16 of the apparatus, serves for retaining the pipe part 1.

Figure 4:
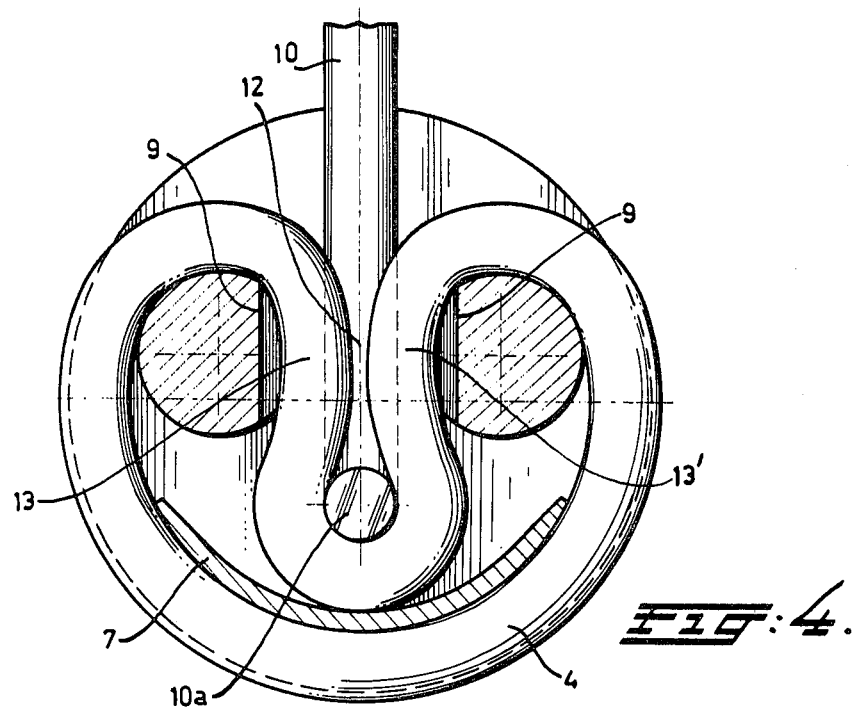
FIG. 4 is a sealing ring in a shape directly after its impression by means of an impressing member.

The apparatus further comprises a sealing ring retaining member being provided with a rotatable axle 5, a rotatable axle 6 and a stationary curved wall 7 all having a flange 8. Both the axles 5 and 6 each comprise flat sides 9, which may be located opposite one another (see FIG. 4).

Figure 6:
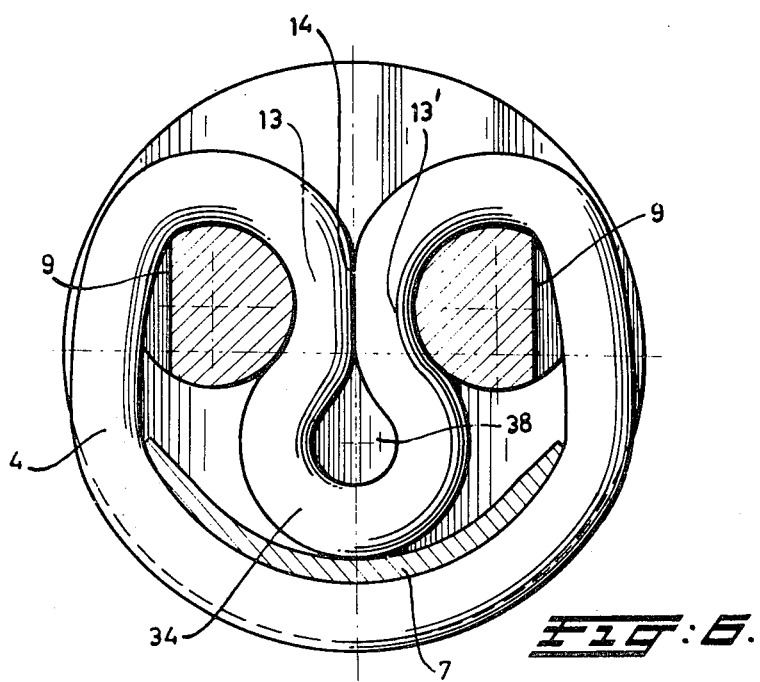
FIG. 6 is an impressed sealing ring in the position as pushed into a socket end.

When the rotatable axles 5 and 6 have obtained the position as shown in FIG. 6, said flat sides 9 are located the most remote from one another, although they extend parallel with one another.

As can be seen, the periphery formed by the curved wall part 7 and the outer circumference of the axles 5 and 6 is smaller than the inner circumference of the sealing ring in an unimpressed form.

The apparatus in accordance with the invention is further provided with an impression member 10, which comprises a vertical part 10, and a part 10a, extending from part 10 under a straight angle, said part 10a running parallel with the axis of the retaining device 15 for retaining pipe part 1.

Figure 2:
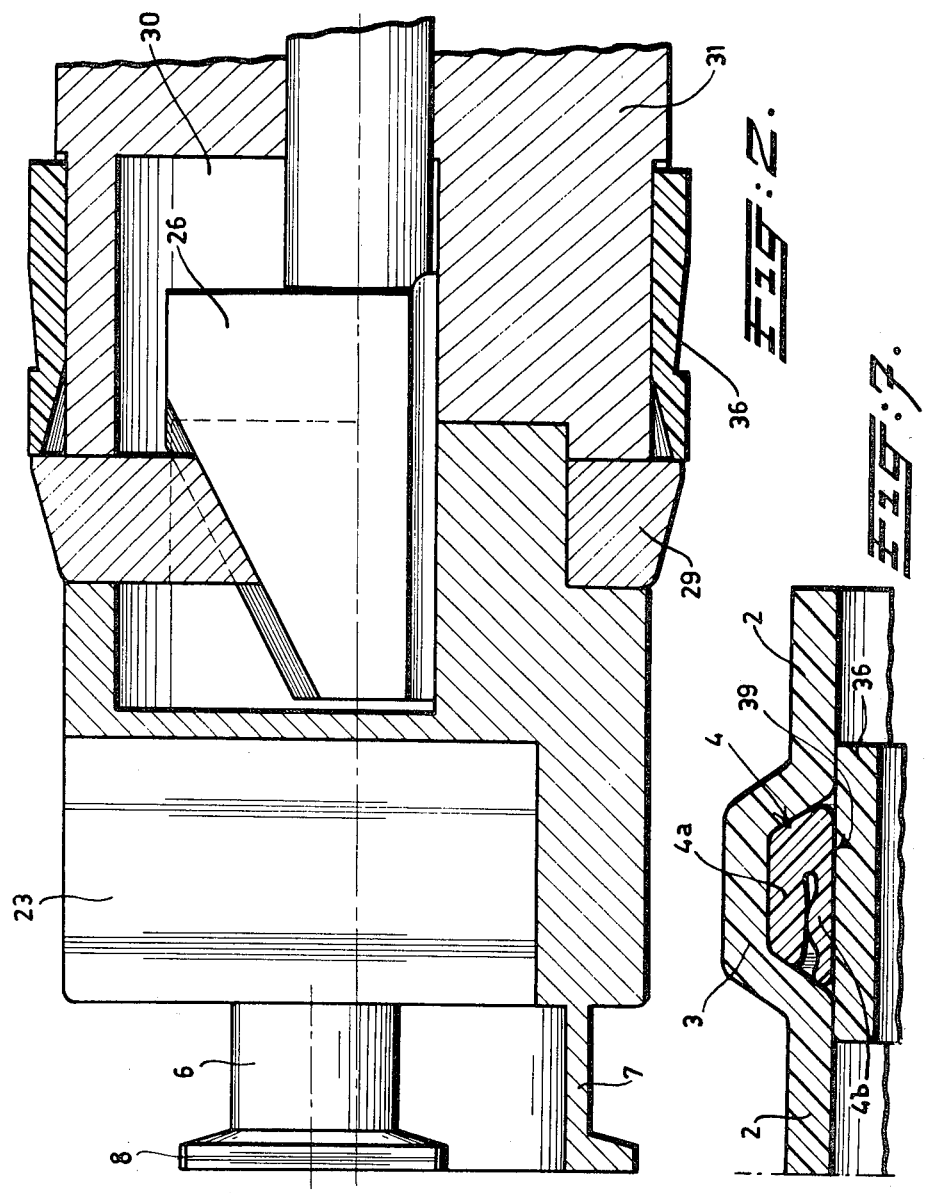
FIG. 2 is a cross-section of a sealing ring and a supporting ring-support member.

Referring now to FIG. 2 portion 10a will obviously impress the sealing ring 4 between two opposite faces 9 of the rotatable axles 5 and 6, and will push said impression farther inwardly until the sealing ring adjoins the inside of the curved wall part 7.

During said pushing toward the interior, an opening 12 may remain between the wall parts 13 and 13' of the impression of the sealing ring.

Subsequently the axles 5 and 6 comprising coarse surfaces, are rotated such, that the flat sides 9 come to lie more remote from one another, which will cause the parts 13 and 13' of the impressed portion of the sealing ring 4 to be pressed against one another; the distance between the rotatable axles 5 and 6 at the location of part 14, is twice as small as the thickness of the sealing ring 4 when being unimpressed.

In order to remove the axially extending portion 10a of the impression member 10, the arm 10 may be subjected to a pivotal movement, thus causing the impression member to regain the position as shown in FIG. 5 by the numerals 10' and 10a'.

In order to perform said pivotal movement of the impression member 10, a pivot 28 is present between a pin 27 and a guide and a friction plate 34 in the guide of pin 27.

So as to supply sealing rings 4, the apparatus according to the invention comprises an endless belt 18 driven by means of a drive mechanism 19. A ring 4 disposed upon belt 18 will fall into the supply container 20 from which the sealing ring is located upon the support 21. A mandrel 40 is conveyed by means of a gear 37, subsequently allowing the sealing ring supporting assembly, comprising the rotatable axles 5 and 6 and the curved wall part 7, to receive the sealing ring 4.

Hereupon the sealing ring 4 is given the position as shown in FIG. 6, by means of the impression member 10 and the axles 5 and 6.

The mandrel 40 is subsequently displaced in the socket end 2 in such a manner that the sealing ring 4 is positioned opposite the groove chamber 3.

Figure 3:
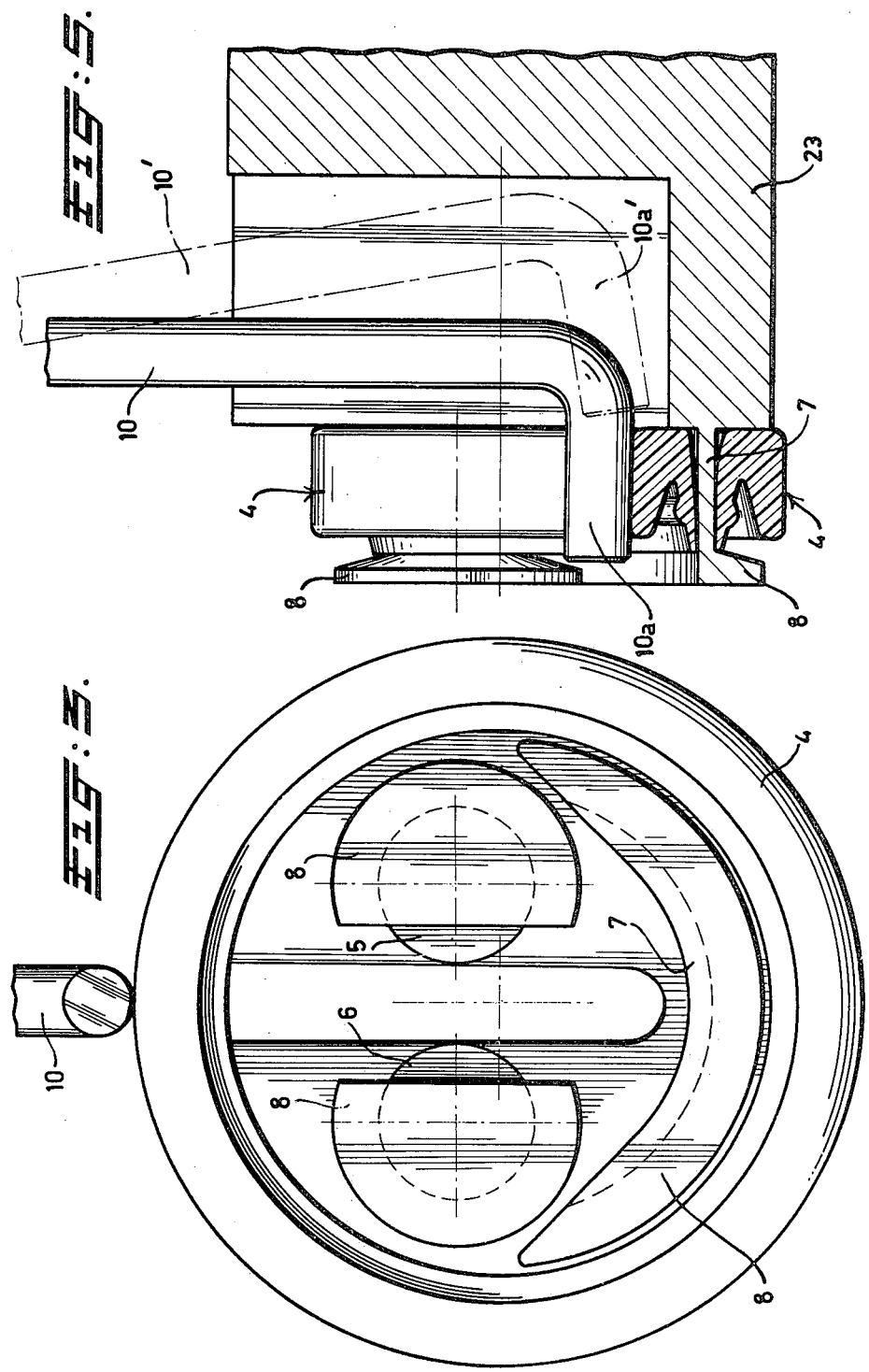
FIG. 3 is a sealing ring prior to its impression.

The axles 5 and 6 will then rotate backward, so that the sealing ring 4 will retain its original position as shown in FIG. 3, which will allow said sealing ring 4 to be received in the groove chamber 3 and to remain in said groove chamber 3.

So as to effectively protect a sealing ring with a lubricating agent applied thereupon, against the action of dust or dirt, a supporting ring 36 is advantageously provided below the sealing ring 4, while sealing off the groove chamber and the sealing ring accommodated therein. When a male pipe part is pushed into a socket end 2, the supporting ring 36 in the socket end will be slid forward toward the pipe part 1.

In order to install said supporting ring 36, an endless belt 25 may be provided which is driven by a drive 38.

On reversing the endless belt 25, a supporting ring 36 will arrive in the guide 24 and from thereon upon support 22.

In order to likewise accomodate said supporting ring 36 in the socket end 2, the mandrel 40 comprises a first mandrel part 30 with an abutment edge 31, upon which the supporting ring 36 is slid. After having slid the supporting ring 36 upon the mandrel part 30, a conical part 26 will expand equidistant circumferential conically extending expandable parts 29 toward the exterior, until the largest circumference of said expandable parts 29 will at least correspond with the circumference of the mandrel part 30, and more preferably with an outer circumference corresponding with that of the supporting ring 36.

In between the outwardly expandable parts 29 and the sealing ring supporting assembly 6, 5, 7, a second mandrel part 23 has a diameter being smaller than or equal to the inner diameter of the supporting ring 36.

After a supporting ring 36 has been disposed upon a support 22, through the guide 24, the level of said support being adapted by means of a suitable mechanism, the mandrel 40 is swung to the left as shown in FIG. 3, so that the supporting ring 36 is received upon the first mandrel part 30, until said supporting ring 36 abuts against the abutment edge 31.

During a subsequent second stage, the sealing ring 4 is installed upon the supporting assembly 5, 6, 7 through guide 20. When the sealing ring is pushed into the socket end 2 and said ring 4 has attained its desired position, the impression of the ring will be terminated (see FIG. 6) at the moment that said sealing ring 4 is positioned opposite the annular groove chamber 3, so that the sealing ring 4 may then be received in said groove chamber 3.

When the mandrel 40 is further displaced, the first mandrel portion 30 will move below the ring 4, thus causing said ring 4 to arrive upon the tapering expandable parts 29, which provide an easy displacement of the supporting ring 36 underneath the sealing ring 4.

After having reached its final position, to wit the position of the supporting ring 36 below the sealing ring 4, the mandrel 40 is removed from the socket end by means of the gear 37. FIG. 2 clearly shows in which manner it is ensured that parts 29 compress the sealing ring in the right manner, thus enabling said sealing ring to easily slide over the supporting ring 36.

It is to be noted that the impression member 10 and the rubber folded thereabout, may pass the flat sides 9 in an unhampered manner, but after part 10a has arrived in its lowermost position, axles 5 and 6 are rotated, said rotation causing the sealing ring 4 to be drawn further inwardly and the rubber of said sealing ring to get clamped between two axles, whereas on the other hand the outside of said sealing ring is tightened or stretched.

The apparatus according to the present invention further comprises control means known per se, by means of which the impression of the sealing ring is accomplished at the right moment of time.

In the foregoing, installing of a sealing ring in a previously formed annular groove chamber has been described, but it will be obvious that said sealing ring may also be used as a means for the formation of the annular groove chamber. In the latter case the sealing ring should exercise a sufficient pressure upon the socket wall so as to form the groove.

It will be obvious from the description that according to the present invention the sealing ring, during inserting same, may be accurately kept in a plane, being perpendicular to the axis of pipe part 1.

FIG. 1 further shows a socket positioning means which comprises a cylinder 32 pushing the abutment 35 forward so that the socket 2 which has been slid forward too far, now obtains the correct position. The clamps 15 give the pipe 1 a rigid position whereafter cylinder 12 is withdrawn and abutment 35 disappears toward the lower side. The opening of socket 2 is then free. The socket 2 may obviously be positioned in various manners.

The second mandrel portion 23 serves for receiving the expandable core 26 for expanding the tapering expandable parts 29.

Figure 8:
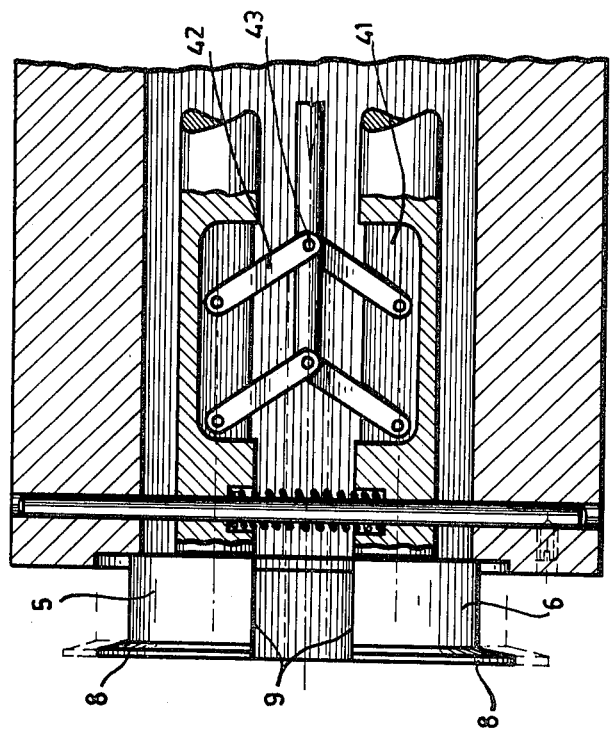
FIG. 8 is a portion of a further embodiment of an apparatus according to the invention.
Figure 9:
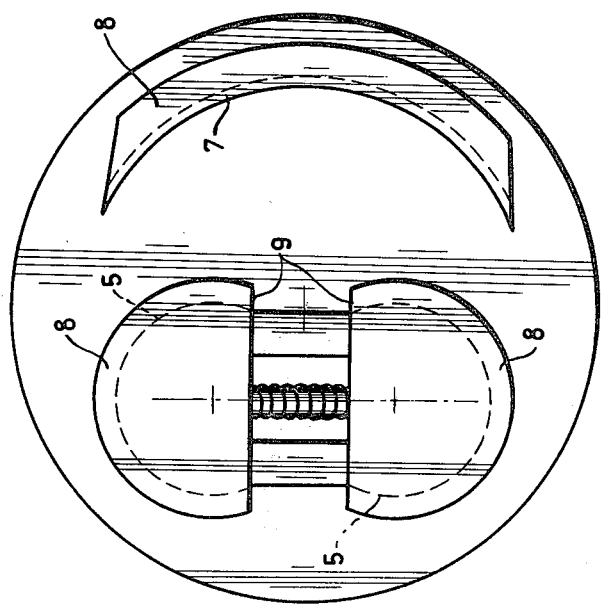
FIG. 9 is a front view of the apparatus of FIG. 8.

Referring now to FIGS. 8 and 9 an embodiment is shown wherein the axle 5 and 6 are not rotatable but reciprocable by means of rods 41, being displaceable by pivotally attached strips 42 which are movably connected with the piston rod 43.

Referring now to FIGS. 10 and 11 (the latter of which shows a cross-section of part of the apparatus as illustrated in FIG. 10) a sealing ring compressing member 44 is shown in the form of a rod. The rod 44 is rotatable about axle 45, a pushing rod 46 being present so as to give the rod 44 a swinging movement. Owing to the swinging movement of rod 44 a sealing ring 4 which would remain partially impressed after having been detached by the axles 5 and 6, can regain its unimpressed form and move into the groove chamber 3. The latter is especially of importance when a sealing ring is used which has an outer circumference exceeding the inner circumference of the bottom of the groove chamber.

Very advantageously the socket 2 and the mandrel 40 may be so positioned eccentrically with respect to one another, that the sealing ring arrives in the groove chamber through the supporting part 7.

In an apparatus according to the present invention the sealing ring 4 is retained in first instance, while the supporting ring 36 is subsequently located therebelow.

In order to supply sealing rings 4 to the apparatus in accordance with the present invention, a vertical feeding channel 48 may be used, which is situated above the endless belt 18 or directly above the hopper 20. A mutual adherence of sealing rings 4 is advantageously prevented by providing the feeding channel 48 with two sloping branches 49 for the supply of sealing rings.

Preferably the conveyor belt 25 is gutter-shaped, which ensures a supply of sealing rings 4 in a correct position.

Sealing rings 4 may appropriately be provided with a lubricating agent 38 which is supplied by a lubricating agent supplying member. The sealing ring 4 efficiently comprises two lips 4a and 4b.

Referring now to FIGS. 12 and 13 part of an apparatus is shown in which the impression member 10 is a rod which moves pivotally around the spindle 51. The rod-shaped impression member may further be longitudinally displaced by displacing the pivot spindle mechanism in a longitudinal slit 50. A handle 52 may swing the rod-shaped impression member 10 toward the outside in the position 10" whilst subsequently after having positioned the sealing ring 4 upon axles 5 and 6 (which now need not be rotatable) said sealing ring is impressed until the latter is tightened or stretched over axles 5 and 6 and curved wall part 7. The impression member 10 now serves for inserting the ring 4, whereas groove 3 serves as a retaining member for said ring. When the correct position opposite the groove chamber 3 is obtained, the impression member 10 is drawn toward the right by displacing the pivot mechanism in the longitudinal slit 50 toward the right. The sealing ring 4 is then detached and received at the groove chamber 3. By means of a longitudinal recess 53 in second mandrel part 23 the displacements of the impression member 10 are effected.

What is claimed is:

1. The process for installing a sealing ring in a whether or not simultaneously formed annular groove chamber disposed in a socket end of a pipe part, wherein the sealing ring is inwardly impressed thereby decreasing its outer diameter, while said impressed sealing ring is then pushed into the socket end, the impression being subsequently terminated and thus the sealing ring is received and left in a groove chamber comprising the following measures:
   (a) impressing the sealing ring while supporting the inside of said sealing ring at either side of an impression in said pipe part and at a third point located opposite the impression,
   (b) pressing the opposite parts of the impression against one another, thereby reducing the total thickness of said opposite parts,
   (c) the said support at either side of said impression being effected by means of whether or not coarse surfaces (5,6) while rotating said surfaces, thereby tightening or stretching the sealing ring across said supports,
   (d) said supporting ring being slid below the sealing ring after the impression of said sealing ring has been terminated,
   (e) providing the sealing ring with a lubricating agent prior to impressing said sealing ring,
   (f) pressing said sealing ring into the groove chamber,
   (g) pressing said sealing ring opposite the impression into the groove chamber whereafter the impression is terminated, and
   (h) imparting to the inner circumference of the sealing ring a diameter which substantially corresponds with the outer diameter of said supporting ring at the location where the sealing ring contacts said supporting ring in the first instance prior to or during installation of a supporting ring in the socket.

2. The process for installing a sealing ring in a whether or not simultaneously formed annular groove chamber disposed in a socket end of a pipe part, wherein the sealing ring is inwardly impressed thereby decreasing its outer diameter, while said impressed sealing ring is then pushed into the socket end, the impression being subsequently terminated and thus the sealing ring being received and left in a groove chamber (3), a supporting ring (36) is slid below the sealing ring (4) after the impression of said sealing ring has been terminated, and the sealing ring (4) is provided with a lubricating agent.

3. The process for installing a sealing ring according to claim 2, wherein the sealing ring is impressed, while supporting the inside of said sealing ring at either side of an impression and at a third point located opposite the impression and the opposite parts of the impression are pressed against one another, thereby reducing the total thickness of said opposite parts.

4. The process according to claim 2, wherein said support at either side of the impression is effected by means of whether or not coarse surfaces (5, 6) while said surfaces are rotated, thereby tightening or stretching the sealing ring across the supports.

5. The process according to claim 2, wherein the sealing ring is pressed opposite the impression into the groove chamber whereafter the impression is terminated.

6. The process according to claim 2, wherein prior to or during installing a supporting ring in the socket, the inner circumference of the sealing ring is given a diameter which substantially corresponds with the outer diameter of the supporting ring at the location where the sealing ring contacts said supporting ring in first instance.

* * * * *